(12) United States Patent
Wyper et al.

(10) Patent No.: US 11,100,485 B2
(45) Date of Patent: Aug. 24, 2021

(54) FRICTIONLESS SHOPPING METHOD AND SYSTEM

(71) Applicant: MASTERCARD INTERNATIONAL INCORPORATED, Purchase, NY (US)

(72) Inventors: Stephane Wyper, Woodland Hills, CA (US); Kevin Michael Morris, O'Fallon, MO (US); Katherine Lindequist, New York, NY (US); Ioannis Tsampalis, Bridgewater, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/822,430

(22) Filed: Mar. 18, 2020

(65) Prior Publication Data
US 2020/0302417 A1 Sep. 24, 2020

Related U.S. Application Data

(60) Provisional application No. 62/820,794, filed on Mar. 19, 2019.

(51) Int. Cl.
*G06Q 20/20* (2012.01)
*G06K 19/06* (2006.01)
*G06Q 30/04* (2012.01)
*G06Q 20/18* (2012.01)

(52) U.S. Cl.
CPC ..... *G06Q 20/204* (2013.01); *G06K 19/06037* (2013.01); *G06Q 30/04* (2013.01); *G06Q 20/18* (2013.01); *G06Q 20/201* (2013.01); *G06Q 20/202* (2013.01)

(58) Field of Classification Search
CPC .... G06Q 20/18; G06Q 20/201; G06Q 20/202; G06Q 20/204
See application file for complete search history.

(56) References Cited

U.S. PATENT DOCUMENTS

| | | | |
|---|---|---|---|
| 9,171,300 B2 * | 10/2015 | Westby | G06Q 20/18 |
| 10,963,834 B1 * | 3/2021 | Thurston | G06Q 10/087 |
| 2002/0147767 A1 | 10/2002 | Brice et al. | |

(Continued)

FOREIGN PATENT DOCUMENTS

| | | |
|---|---|---|
| CN | 107918986 A | 4/2018 |
| CN | 108346050 A | 7/2018 |
| CN | 109215254 A | 1/2019 |

OTHER PUBLICATIONS

"International Search Report and Written Opinion Issued in PCT Application No. PCT/US2020/023356", dated Jul. 8, 2020, 11 Pages.

*Primary Examiner* — A. Hunter Wilder
(74) *Attorney, Agent, or Firm* — Talem IP Law, LLP (57) ABSTRACT

A frictionless shopping platform supports modular systems to outfit any physical store with a secure self-checkout experience. The frictionless shopping platform can communicate with a kiosk or mobile application to obtain customer information including payment information; a shopping sensor platform that tracks a user in the store to obtain anonymous shopper identification and associated shopping cart items; and a financial services provider to affect payment.

12 Claims, 9 Drawing Sheets

(56) References Cited

U.S. PATENT DOCUMENTS

| | | | |
|---|---|---|---|
| 2013/0332271 A1* | 12/2013 | Hay | G06Q 20/20 |
| | | | 705/14.51 |
| 2015/0012396 A1* | 1/2015 | Puerini | G06K 9/00771 |
| | | | 705/28 |
| 2015/0073925 A1* | 3/2015 | Renfroe | G06Q 50/12 |
| | | | 705/15 |
| 2018/0075462 A1* | 3/2018 | Jones | G06Q 30/0201 |
| 2018/0295424 A1 | 10/2018 | Taylor et al. | |
| 2018/0365668 A1 | 12/2018 | Hay | |
| 2019/0281030 A1* | 9/2019 | Isaacson | G06Q 30/0633 |
| 2020/0175489 A1* | 6/2020 | Huang | G06Q 20/18 |

* cited by examiner

FRICTIONLESS SHOPPING METHOD AND SYSTEM

CROSS-REFERENCE TO RELATED APPLICATION

This application claims the benefit of U.S. Provisional Application No. 62/820,794, filed Mar. 19, 2019.

BACKGROUND

Consumers often purchase goods at local retailers by waiting in a shopping line and paying at a checkout counter. The checkout counter may be serviced by an employee of the store that scans all of the items before the items are paid for by the consumer or the checkout counter may be a self-checkout point of sale system.

In recent times, mobile shopping applications have become more popular. Such applications allow consumers to compare and manage shopping lists for products such as groceries, office supplies, home accessories, gardening supplies, etc. Some mobile shopping applications enable a consumer to order food, including baked goods and drinks, for pick up or delivery.

BRIEF SUMMARY

Frictionless shopping methods and systems are provided. A frictionless shopping platform is described that supports modular systems to outfit any physical store with a secure self-checkout experience.

A frictionless shopping method carried out by the frictionless shopping platform can begin with receipt of payment information of a customer and an identifier of the customer. The payment information and identifier of the customer can be obtained via an onsite kiosk at a store or a mobile application on the customer's computing device. The identifier of the customer is stored on the frictionless shopping platform and the payment information is used to obtain pre-authorization for payment. For example, a pre-authorization package that includes the payment information of the customer is sent to a financial services provider in order to obtain a payment pre-approval. Once the payment pre-approval for the customer is received from the financial services provider, an authorization for the customer is provided to the customer to begin shopping and an indication that the customer is approved for entering the store is provided to a shopping sensor platform.

An anonymous shopper identifier is received from the shopping sensor platform in response to providing the indication that the customer is approved for entering the store. The frictionless shopping platform receives, from the shopping sensor platform, item information tied to the anonymous shopper identifier. The item information may be received after the customer leaves the store or in real time as the customer adds and removes the items from their cart. The frictionless shopping platform maintains the relationship between the customer identifier and the anonymous shopper identifier as well as the relationship between the anonymous shopper identifier and the anonymous shopper's cart in a shopping cart resource such that the items in the anonymous shopper's cart can be attributed to the customer identifier and appropriate payment information.

An invoice based on the items indicated as in the anonymous shopper's cart associated with the customer identifier is generated upon determining conclusion of the shopping session; and the invoice is provided to the financial services provider for payment processing. Payment confirmation of the invoice is received; and a digital receipt is provided to the customer indicating the payment confirmation of the invoice.

The payment information of the customer and the identifier of the customer may be authenticated using a biometric authentication. The biometric authentication may be a voice authentication, a facial recognition authentication, or a fingerprint authentication.

The identifier of the customer may be an email, telephone number, or the like, or may be some other form of identifier that is adequate to identify the customer and where to send the receipt.

In another aspect, a method for analyzing frictionless shopping data includes receiving aggregate data on inventory of a plurality of items and customer traffic from an anonymous shopping cart resource. The aggregate data comprises a number of each of the plurality of items that are available for purchase, a number of items that are purchased from a merchant store, and a number of customers that enter the merchant store. The method further includes applying one or more optimizing criteria to the aggregate data and adjusting the price of at least one of the plurality of items based on the one or more optimizing criteria or adjusting inventory of the number of at least one of the plurality of items that are available for purchase.

In some cases, the one of the one or more optimizing criteria comprises a ratio of the number of one of the plurality of items that are sold by the amount of foot traffic.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Frictionless shopping methods and systems are provided. A frictionless shopping platform is described that supports modular systems to outfit any physical store with a secure self-checkout experience.

Shoppers can experience a fast and convenient way to get items from retailers, grocery stores, and restaurants, among other shops.

In a mobile application ("app") experience scenario, customers can securely check themselves in within an app to begin the shopping journey. Once in the space, customers can then pick the items they want. By supporting a shopping sensor platform that may use computer vision and/or other sensors and systems, it is possible to anonymously detect what products have been picked. When the customer leaves the store, the customer can see the transaction occur within their app by having the payment completed to their card on file.

In an onsite kiosk experience scenario, customers can approach an unattended market, and pick up items they want. The customer may complete the transaction in front of a digital display, where the cart is automatically populated (no scanning), or the customer may have the transaction automatically completed when leaving the store if the customer entered the payment information via the digital display prior to finishing their selections (or at the time of entry to the store). As with the app experience scenario, by supporting a shopping sensor platform that may use computer vision and/or other sensors and systems, it is possible to anonymously detect what products have been picked.

In any scenario, the shopping sensor platform can provide information that when collected by the frictionless shopping platform can indicate traffic and frequency in the store, what items are being browsed, and what is being purchased. Analytics and insights can be applied to this data to support automated inventory and pricing options as some examples.

Figure 1A:
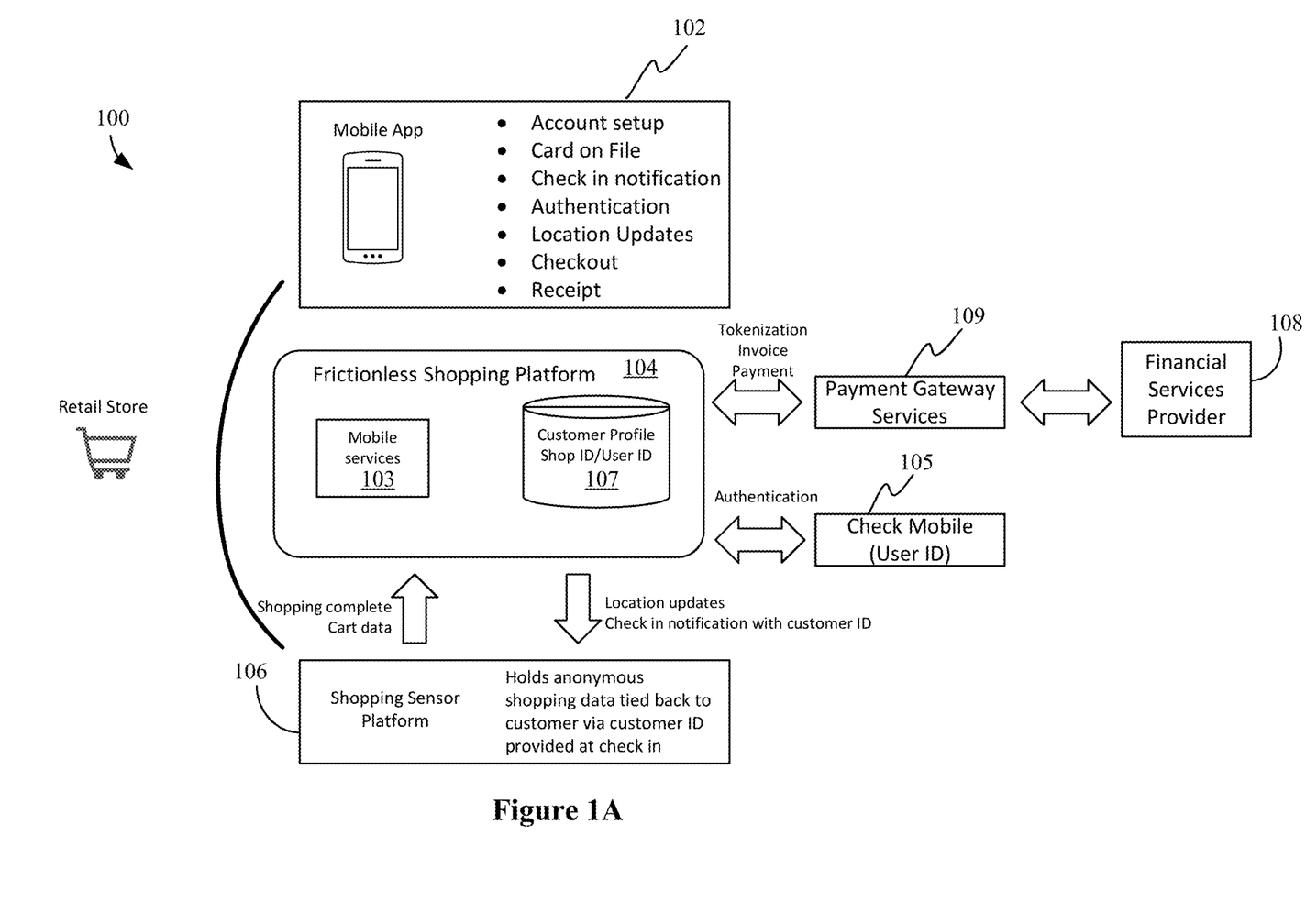
FIG. 1A illustrates an example environment for frictionless shopping using a mobile app.

FIG. 1A illustrates an example environment for frictionless shopping using a mobile app. Referring to FIG. 1A, an example environment 100 includes a mobile app 102, frictionless shopping platform 104, shopping sensor platform 106, and financial services provider 108.

In this case, the mobile app 102 may be executed on any suitable mobile device and includes the ability to set up a user account, store (or obtain) payment card information (e.g., card on file (COF)), provide notification of a check-in at a retailer, provide authentication of the user, provide location updates, support check-out, and receive a receipt. The user account can include a customer identifier (e.g., email, telephone number, user name) and both the customer identifier and payment information may be provided to the frictionless shopping platform 104. Authentication may be via biometric authentication, password, two-step authentication method via third party email or telephone number and/or location data. Certain authentication information may be confirmed via the frictionless shopping platform 104 (which may communicate with an authenticator 105 that supports the mobile app, including account setup for the user).

The frictionless shopping platform 104 stores the customer profiles (anonymous identifiers provided by shopping sensor platform 106 and private/personal customer identifiers provided by customer via mobile app 102) in a storage resource 107, communicates payment information to financial services provider 108 and receives the corresponding payment approval or rejection of payment for invoices from the financial services provider 108, receives and stores anonymous shopping data from a shopping sensor platform 106, matches anonymous shopping IDs generated by the shopping sensor platform 106 to private customer data (e.g., customer identifier, payment information), sends location updates and check-in notifications with a unique ID to the shopping sensor platform 106, and receives authentication data from the mobile app 102 that is then sent to the authenticator 105 for authentication. In some cases, the platform 104 passes the authentication (or lack thereof) received from the authenticator 105 to the mobile app 102. One or more of these actions can be performed as part of mobile services 103.

The shopping sensor platform 106 generates and stores anonymous shopping ID and data that is provided to the frictionless shopping platform 104. The shopping sensor platform 106 tracks customer movement throughout the merchant store as well as the items the customer leaves the store with, and this information is sent to the frictionless shopping platform 104 for facilitation of payment for the items and matching to appropriate customer. In some cases, only some of this information may be sent to the frictionless shopping platform 104 (e.g., the items the customer leaves the store with and the anonymous shopping ID) or all of this information may be sent to the frictionless shopping platform 104 (e.g., items picked up, but not purchased). In some cases, only the items the customer leaves the store with and the anonymous shopping ID are sent to the frictionless shopping platform 104 initially, and aggregate data from all of the customers that visit the merchant store may be sent to the frictionless shopping platform 104 periodically (e.g., at the end of every day). The shopping sensor platform 106 may store aggregate information.

The particular sensor systems used by the shopping sensor platform 106 may be any suitable systems including, but not limited to, camera sensors, pressure sensors, electro-magnetic based sensors, optical sensors, and/or RFID (radio frequency identification) systems. One or more sensors can be integrated with computer vision systems for tracking and evaluating user movement and item movement. Advantageously, the frictionless shopping platform 104 can communicate with effectively any shopping sensor platform 106 through one or more application programming interfaces (APIs) that enable the communication of location updates and check-in confirmation from the frictionless shopping platform 104 to the shopping sensor platform 106; and the communication of shopping card data (and optionally other tracking data) from the shopping sensor platform 106 to the frictionless shopping platform 104. The location updates can be provided, by approval of the user, via the mobile device and the mobile app (e.g., the mobile app 102 being supported by the frictionless shopping platform 104).

The financial services provider 108 processes payments based on the routing indicated by the payment information that is tied to the customer for the items that the customer leaves the store with, which is sent to the financial services provider 108 by the frictionless shopping platform 104. The payment gateway services 109 may initially approve or decline (e.g., pre-authorization) the request for payment as the issuer of the payment information (e.g., payment card). The pre-authorization may occur at the time the user/customer checks in via their mobile app 102.

Figure 1B:
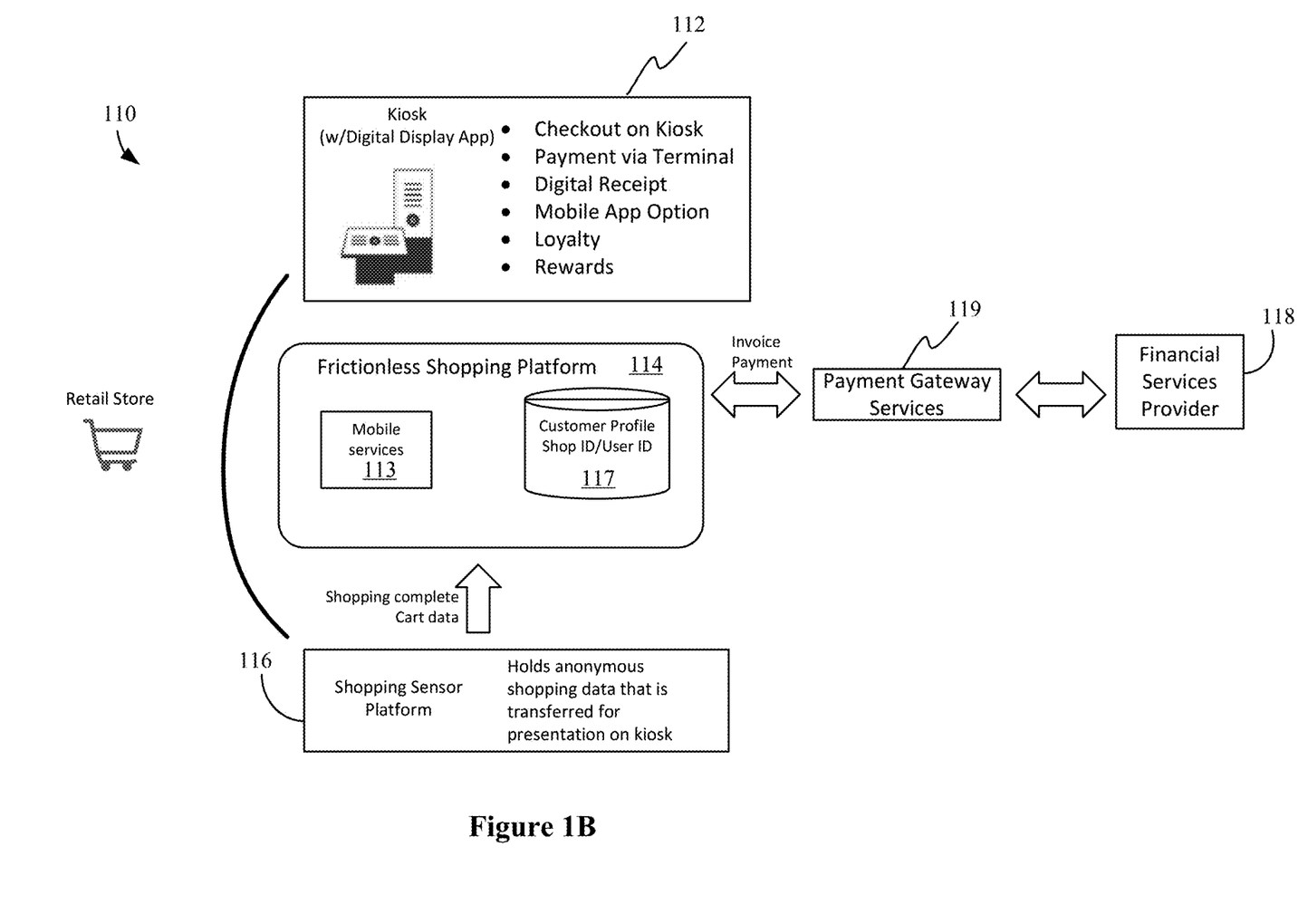
FIG. 1B illustrates an example environment for frictionless shopping using a kiosk.

FIG. 1B illustrates an example environment for frictionless shopping using a kiosk. Referring to FIG. 1B, an example environment 110 includes a kiosk 112, frictionless shopping platform 114, shopping sensor platform 116, and financial services provider 118.

In this case, the kiosk 112 includes an application (e.g., digital display app) that supports check-in/check-out, payment via terminal, and digital receipt support. Other features are possible via the application on the kiosk 112, including setting up and/or managing a user account (which further enables user-specific features and rewards). In one implementation, the kiosk 112 can receive a customer identifier (e.g., email or telephone number) via a user input device (e.g., touch screen, keyboard, camera, or scanner) and payment information via a point of sale terminal (e.g., card reader, QR code scanner, fob reader, and other physical or wireless payment options). The kiosk 112 also includes the ability, for example, via a network interface, to provide the customer identifier and the payment information to the frictionless shopping platform 114.

In some cases, the kiosk 112 can include a printer such that a physical ticket and/or receipt can be printed and provided to a customer. In some cases, a digital receipt may be sent by the kiosk 112 via email or SMS/MMS to contact information provided by the customer (which may be the customer identifier). In some cases, the frictionless shopping platform 114 can send the digital receipt to the customer using the contact information provided by the customer to the kiosk 112 (which in turn is provided to the frictionless shopping platform 114). In some cases, the kiosk 112 may be enabled to supply the customer with access to the merchant store (e.g., via a printout of a QR code that is used to scan for access to the merchant store). In some cases, such as when the kiosk 112 is accessed after entry to the store, the kiosk 112 can be similar to self-checkout kiosks but without requiring scanning of the items (as the kiosk 112 would receive information from the frictionless shopping platform 114 regarding invoice).

The frictionless shopping platform 114 stores the customer profiles (anonymous identifiers provided by shopping sensor platform 116 and private/personal customer identifiers provided by customer via kiosk 112) in storage resource 117, communicates payment information to financial services provider 118 and receives the corresponding payment approval or rejection of invoices from the financial services provider 118, receives and stores anonymous shopping data from a shopping sensor platform 116, and matches anonymous shopping IDs generated by the shopping sensor platform 116 to private customer data (e.g., customer identifier, payment information). In some cases, frictionless shopping platform 114 sends check-in notifications (that a customer is registered and permitted access to the store) to the shopping sensor platform 116. One or more of these actions can be performed as part of mobile services 113.

The shopping sensor platform 116 generates and stores anonymous shopping ID and data that that is provided to the frictionless shopping platform 114. The shopping sensor platform 116 tracks customer movement throughout the merchant store as well as the items the customer leaves the store with, and this information is sent to the frictionless shopping platform 114 for facilitation of payment for the items. In some cases, only some of this information may be sent to the frictionless shopping platform 114 (e.g., the items the customer leaves the store with and the anonymous shopping ID) or all of this information may be sent to the frictionless shopping platform 114. In some cases, only the items the customer leaves the store with and the anonymous shopping ID are sent to the frictionless shopping platform 114 initially, and aggregate data from all of the customers that visit the merchant store may be sent to the frictionless shopping platform 114 periodically (e.g., at the end of every day). The shopping sensor platform 116 may store aggregate information.

The particular sensor systems used by the shopping sensor platform 116 may be any suitable systems including, but not limited to, camera sensors, pressure sensors, electro-magnetic based sensors, optical sensors, and/or RFID systems. One or more sensors can be integrated with computer vision systems for tracking and evaluating user movement and item movement. Advantageously, the frictionless shopping platform 114 can communicate with effectively any shopping sensor platform through one or more APIs that enable the communication of check-in confirmation from the frictionless shopping platform 114 to the shopping sensor platform 116; and the communication of shopping card data (and optionally other tracking data) from the shopping sensor platform 116 to the frictionless shopping platform 114.

The financial services provider 118 processes payments based on the routing indicated by the payment information that is tied to the customer for the items that the customer leaves the store with, which is sent to the financial services provider 118 by the frictionless shopping platform 114. The payment gateway services 119 may initially approve or decline (pre-authorization) the request for payment as the issuer of the payment information (e.g., payment card). The pre-authorization may occur at the time the user/customer checks in via the kiosk 112.

Figure 2:
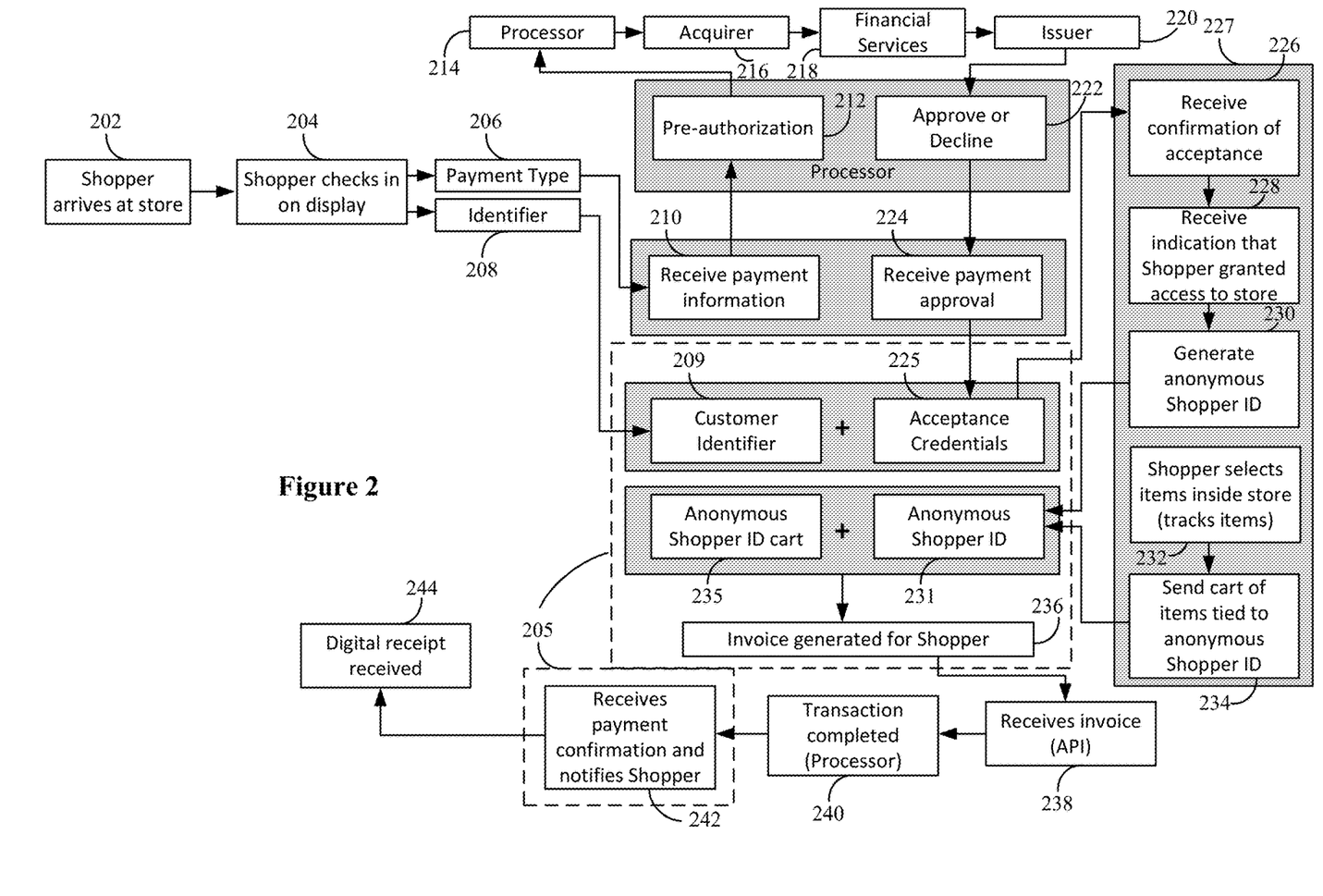
FIG. 2 illustrates a schematic diagram of a frictionless shopping experience.

FIG. 2 illustrates a schematic diagram of a frictionless shopping experience. Although not shown in a sequence diagram format, the frictionless shopping experience includes user interaction/actions, actions carried out by the frictionless shopping platform 205 (which may be implemented as platforms 104 and 114 such as described with respect to FIGS. 1A and 1B), actions carried out by a payment platform (e.g., financial services provider 108, 118 described with respect to FIGS. 1A and 1B), and actions carried out by a shopping sensor platform (e.g., shopping sensor platform 106, 116 described with respect to FIGS. 1A and 1B). Additional services and systems may be used to carry out some of the actions.

In FIG. 2, the scenario is based on a kiosk experience; however, actions carried out by the frictionless shopping platform may be applicable, at least in part, to the mobile app experience.

The illustrated frictionless shopping experience may begin when a shopper arrives (202) at the merchant store. The shopper then checks in (204) on a kiosk display by entering a payment type 206 and an identifier 208. The identifier 208 may be an email or phone number as examples. The payment type 206 and identifier 208 can be communicated from the kiosk to the appropriate systems via one or more APIs. The APIs may be supported by the frictionless shopping platform or by a third-party service.

An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

The API is generally a set of programming instructions and standards for enabling two or more applications to communicate with each other and is commonly implemented over the Internet as a set of Hypertext Transfer Protocol (HTTP) request messages and a specified format or structure for response messages according to a REST (Representational state transfer) or SOAP (Simple Object Access Protocol) architecture.

An API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic.

The API-calling component may be a local component (i.e., on the same data processing system as the API-implementing component) or a remote component (i.e., on a different data processing system from the API-implementing component) that communicates with the API-implementing component through the API over a network.

In the illustrated scenario, payment information 206 can be received (210) and communicated to a payment processor (e.g., financial services provider) for pre-authorization (212). The pre-authorization processes (214, 216, 218, and 220) can be carried out according to conventional pre-authorization processing. The payment processor will receive the information regarding whether the payment pre-authorization was approved or declined (222); and communicates that information via an API (that receives payment approval 224) to the frictionless shopping platform, which stores the information as acceptance credentials 225 (e.g., in the storage resource 107, 117 of FIGS. 1A and 1B). Although not shown, results from the pre-authorization processes can be communicated to the kiosk (or customer's mobile app). The communication may be from the frictionless shopping platform 205 or from the payment network directly.

The identifier 208 may be received by and stored at the frictionless shopping platform 205 as customer identifier 209 (e.g., in the storage resource 107, 117 of FIGS. 1A and 1B).

An indication that the acceptance credentials 225 have been received are then provided by the frictionless shopping platform 205 to the shopping sensor platform 227. The indication does not include private or personal information, but rather that a user is approved for purchasing items. The shopping sensor platform 227 receives the confirmation of acceptance (226) and also an indication that the shopper has been granted access to the store (228). As will be described in more detail with respect to FIG. 5A, a customer (and optionally other people to be associated with that same customer payment, such as other people who are to be shopping with the customer who provided payment information) may enter the store using a QR code. The indication that a shopper has been granted access to the store can cause the shopping sensor platform 227 to generate an anonymous shopper identifier (230) (to be used when tracking the customer). The shopping sensor platform 227 sends the anonymous shopper ID that is associated with the shopper to the frictionless shopping platform 205. The shopping sensor platform 227 also tracks the items that the shopper selects (232) while inside the store and sends (234) the list of items to the frictionless shopping platform 205 as an anonymous shopper ID cart (235).

Figure 5A:
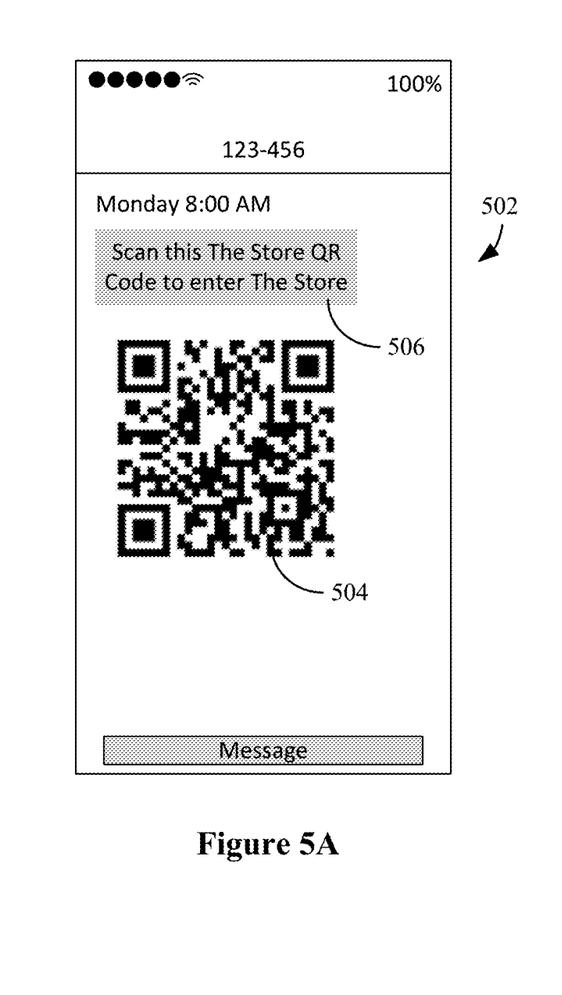
FIG. 5A illustrates a QR code used for entering a frictionless shopping merchant store that is received via a mobile device.
Figure 5B:
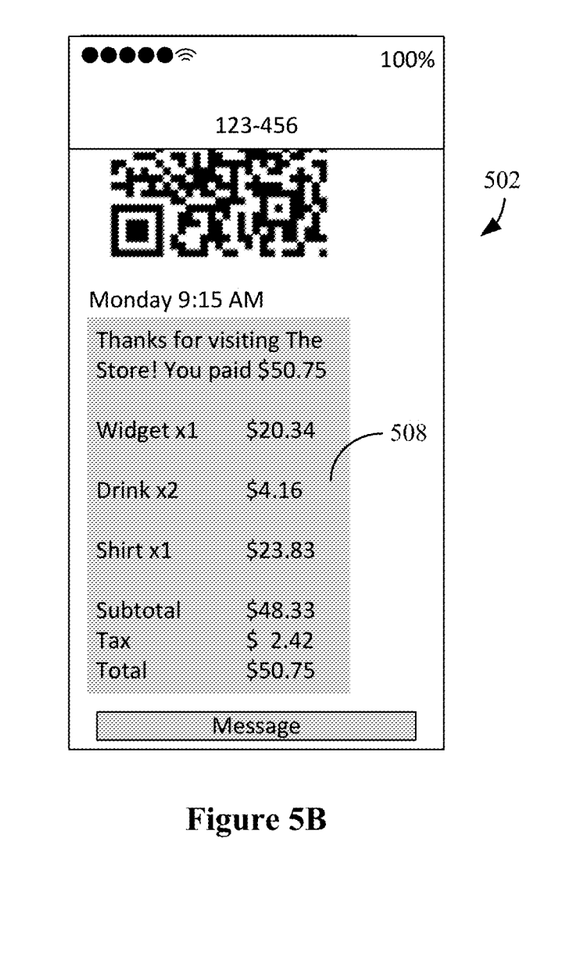
FIG. 5B illustrates a receipt received after purchasing items at a frictionless shopping merchant store via a mobile device.

The frictionless shopping platform 205 may match and/or associate the anonymous shopper ID cart 235 and the anonymous shopper ID 231 with the customer identifier 209 (and store these data in a storage resource such as storage resource 107, 117 of FIGS. 1A and 1B). The frictionless shopping platform 205 can generate (236) an invoice for the shopper; and communicate via an API 238 to send the invoice to the payment processor to complete the transaction (e.g., apply payment). Once the transaction is completed (240), the frictionless shopping platform 205 may receive (242) the payment confirmation and notify the shopper by sending a digital receipt to, for example, the customer based on the identifier 208 originally provided by the customer (and stored as customer identifier 209). The digital receipt can be received (244) by the customer (e.g., via the communication channel associated with the identifier 208). An example of a digital receipt is shown in FIG. 5B.

Figure 3A:
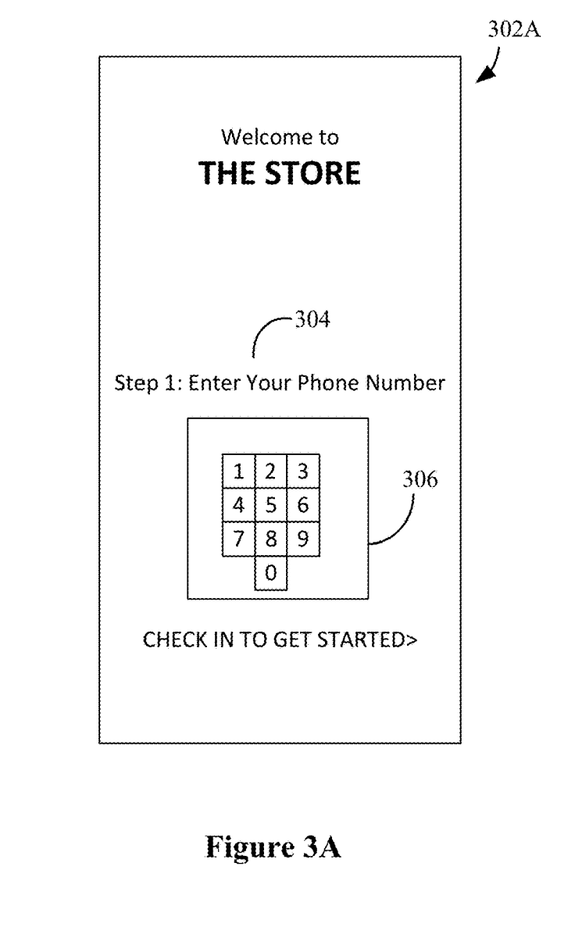
FIGS. 3A-3C illustrate example user interfaces for entering a frictionless shopping merchant store.
Figure 3B:
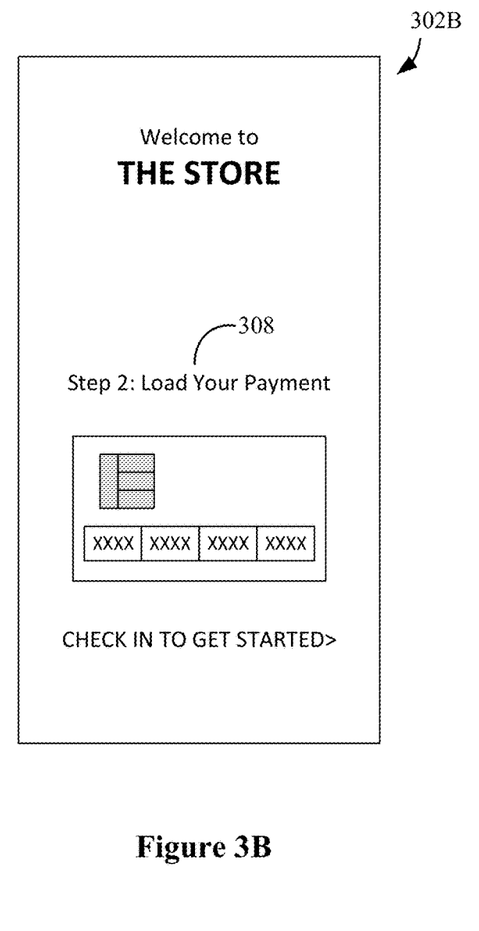
Figure 3C:
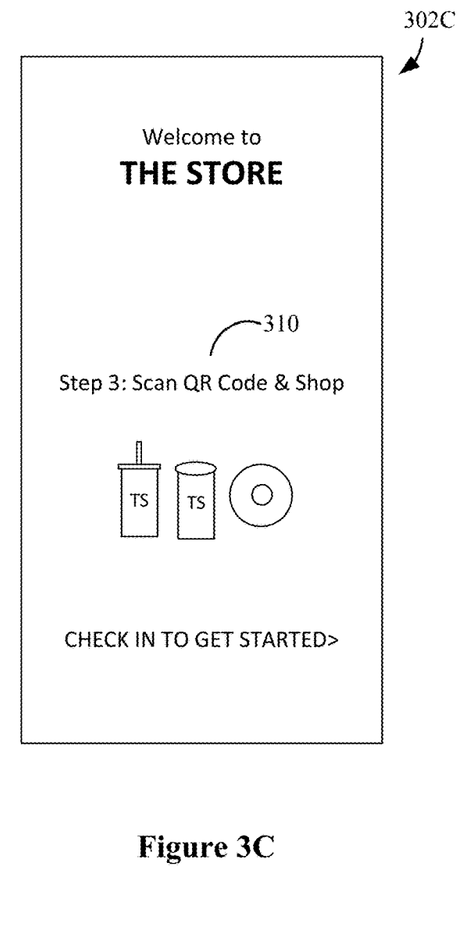

FIGS. 3A-3C illustrate example user interfaces for entering a frictionless shopping merchant store. Referring to FIG. 3A, when a user approaches a store, a user interface 302A may include instructions 304 that state "Step 1: Enter Your Phone Number." In this case, the instructions 304 prompt a user to enter their telephone number, however, in other cases, different instructions may be implemented that prompt a user to enter their email or some other method of communication that would enable the user to receive information, such as a QR code. The phone number (or email) may be used as an identifier 208/209, such as described with respect to FIG. 2 (or as described with respect to functionality of mobile app 102 or kiosk 112 of FIGS. 1A and 1B). In the illustrated scenario, because the instructions 304 are intended to prompt the user to input the user's telephone number, a telephone number field 306 is displayed to receive the user's input of the user's telephone number.

FIG. 3B illustrates user interface 302B that includes instructions 308 that state "Step 2: Load Your Payment." In this case, the instructions 308 prompt a user to enter their payment information (e.g., credit card). The payment information may be received by a credit card number field (not shown) that is similar to the telephone number field 306 shown in FIG. 3A. Alternatively, in some cases in which a kiosk is used, a camera may be supplied to take a photo of the payment information to facilitate payment of the items the customer purchases. In other cases, the payment information may be received by swiping, inserting, or tapping a payment card into a payment receival system (not shown) located on the kiosk. In some cases in which a mobile application is used, the mobile application may be enabled to access the camera of the mobile device to take a photo of the payment information to facilitate payment of the items the customer purchases. In other cases in which a mobile application is used, a credit card number field may be used to receive the payment information. In yet other cases in which a mobile application is used, payment information can be communicated via a wallet application. Upon receipt of the payment information, a pre-authorization process may be carried out such as described with respect to processes 210-224 of FIG. 2. If acceptance credentials are received by the frictionless shopping platform (e.g., 225), a shopper may be granted access to the store. In some cases, a QR code may be provided to grant access to the store, for example as shown in FIG. 5A.

FIG. 3C illustrates user interface 302C that includes instructions of 310 that state "Step 3: Scan QR Code & Shop." In this case, the instructions 310 prompt a user to scan, via a scanner located outside the store, a QR code that was sent to the user via text message to the telephone number the user entered in the first step. In response to scanning (and the verification of) the QR code, the user is granted access to the merchant store. In other cases, the QR code may be sent to the user's email, mobile phone, or other form of communication that is entered by the user in step 1. In other cases, the QR code may be replaced by some other form of verification, such as an alpha-numerical code, or any other form appropriate for verifying the user is allowed to enter the store. In some cases in which a kiosk is used, a QR code or other form of verification may be printed out for scanning to enter the store. It should be understood that scenarios are possible in which a phone number or other identifier may not be required in order to enter the store or purchase items.

Figure 4A:
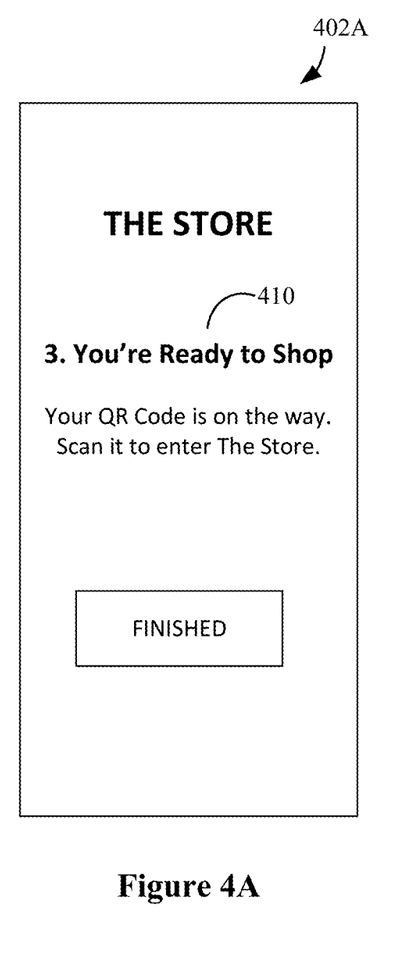
FIGS. 4A and 4B illustrate an example user interfaces post pre-authorization of payment information.
Figure 4B:
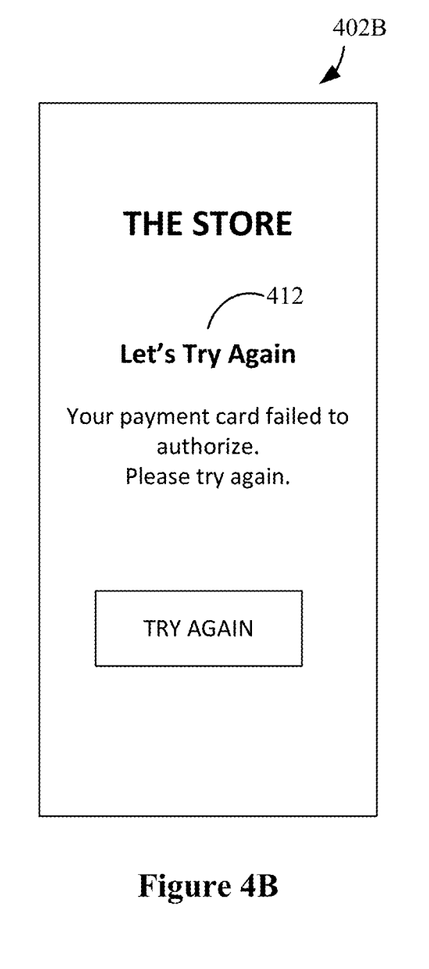

FIGS. 4A and 4B illustrate an example user interfaces post pre-authorization of payment information. In the example scenario described with respect to FIGS. 3A-3C, pre-authorization/acceptance credentials were obtained. Referring to FIG. 4A, user interface 402A may be provided similarly to user interface 302C of FIG. 3C, but may be for a scenario where the kiosk is outside of the store and approval grants access to enter the store by including instructions 410 that state "You're Read to Shop. Your QR code is on the way. Scan it to enter The Store." In this case, the instructions 410 prompt the user to scan, via a scanner located outside of the merchant store, a QR code that was sent to the user via text message to the telephone number the user entered (e.g., as shown in FIG. 3A). In response to scanning (and the verification of) the QR code, the user is granted access to the merchant store. In other cases, the QR code may be sent to the user's email or other contact mechanism. In other cases, another form of verification that is appropriate for verifying the user is allowed to enter the store may be used in addition to or in lieu of the QR code.

FIG. 4B illustrates an alternate third step of this process, which is used when the payment method used by the user fails to authorize. In particular, the user interface 402B includes instructions 412 that state "Let's Try Again. Your payment card failed to authorize. Please try again." In this case, the instructions 412 prompt the user to try to enter payment information again, because the first time the user entered the payment information, the system used for authorizing payment information failed to authorize the payment method for whatever reason. The user may enter the same payment information or may try to enter the same payment information for authorization.

FIG. 5A illustrates a QR code used for entering a frictionless shopping merchant store that is received via a mobile device. Referring to FIG. 5A, a QR code can be received by a user at their mobile device. Here, the QR code 504 is displayed in a message application on a mobile device screen 502. This QR code 504 may be sent in response to the second step described with respect to FIG. 3B and used in the manner described with respect to FIG. 3C or 4C. A message including instructions 506 can be sent with the QR Code 504 that prompts the user to scan the QR code 504 to gain access to the merchant store. In some cases, instead of a QR code 504, an alpha-numeric code or some other appropriate verification information may be supplied to the mobile device to allow the user to enter the merchant store. In some cases, the QR code 504 or other appropriate verification information may be printed out for the user to use or scan to enter the merchant store.

FIG. 5B illustrates a receipt received after purchasing items at a frictionless shopping merchant store via a mobile device. In this case, the digital receipt 508 includes a list of all the items the user purchased (by picking up the items and leaving the store), including one widget 512 for $20.34, two drinks 514 for $4.16 total, and one shirt 516 for $23.83. The digital receipt 508 also includes a subtotal amount 518, tax amount 520, and total amount 522. It should be understood that the format of the receipt and other itemized information can be any suitable format recognized as a receipt.

Figure 6:
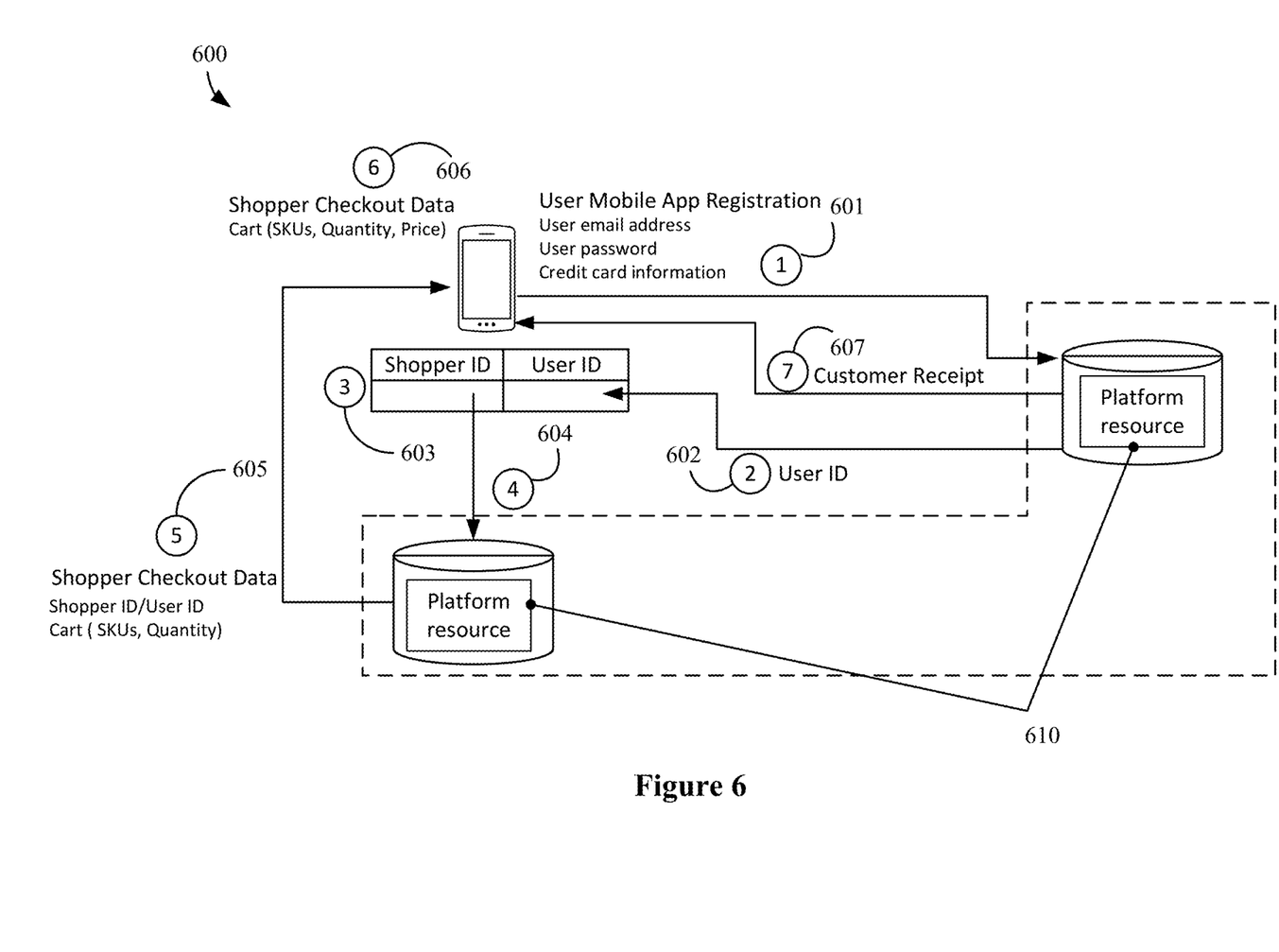
FIG. 6 illustrates a specific example of a method for frictionless shopping.

FIG. 6 illustrates a process diagram for frictionless shopping with a mobile app. Processes 600 may occur in a similar environment such as described with respect to FIG. 1A. The experience begins with mobile app registration (601) that includes receiving, at the user's computing/mobile device, a user's email address, a password (can be biometric), and credit card information. The user's email address, password, and credit card information are then sent to a frictionless shopping platform (which receives the information and stores the information in a platform resource 610). The email may be used by the platform to create (602) a user ID, which may be any identifier that is adequate to identify the user. An anonymous shopper ID is received (603) from the shopping sensor platform and matched/associated (604) to the user ID (e.g., by the frictionless shopping platform and stored in the platform resource 610). The frictionless shopping platform manages shopper checkout cart data (e.g., based on the SKUs and quantity of items the user leaves the store with) (605); and the shopper checkout data is associated with the user ID so that at least some of the shopper checkout data can be provided to the appropriate user for viewing at the mobile device (606). When the transaction is finalized, the customer receipt can be provided (607) to the user for viewing within the mobile app or via an email or messaging application as indicated by the user's preferences.

Figure 7:
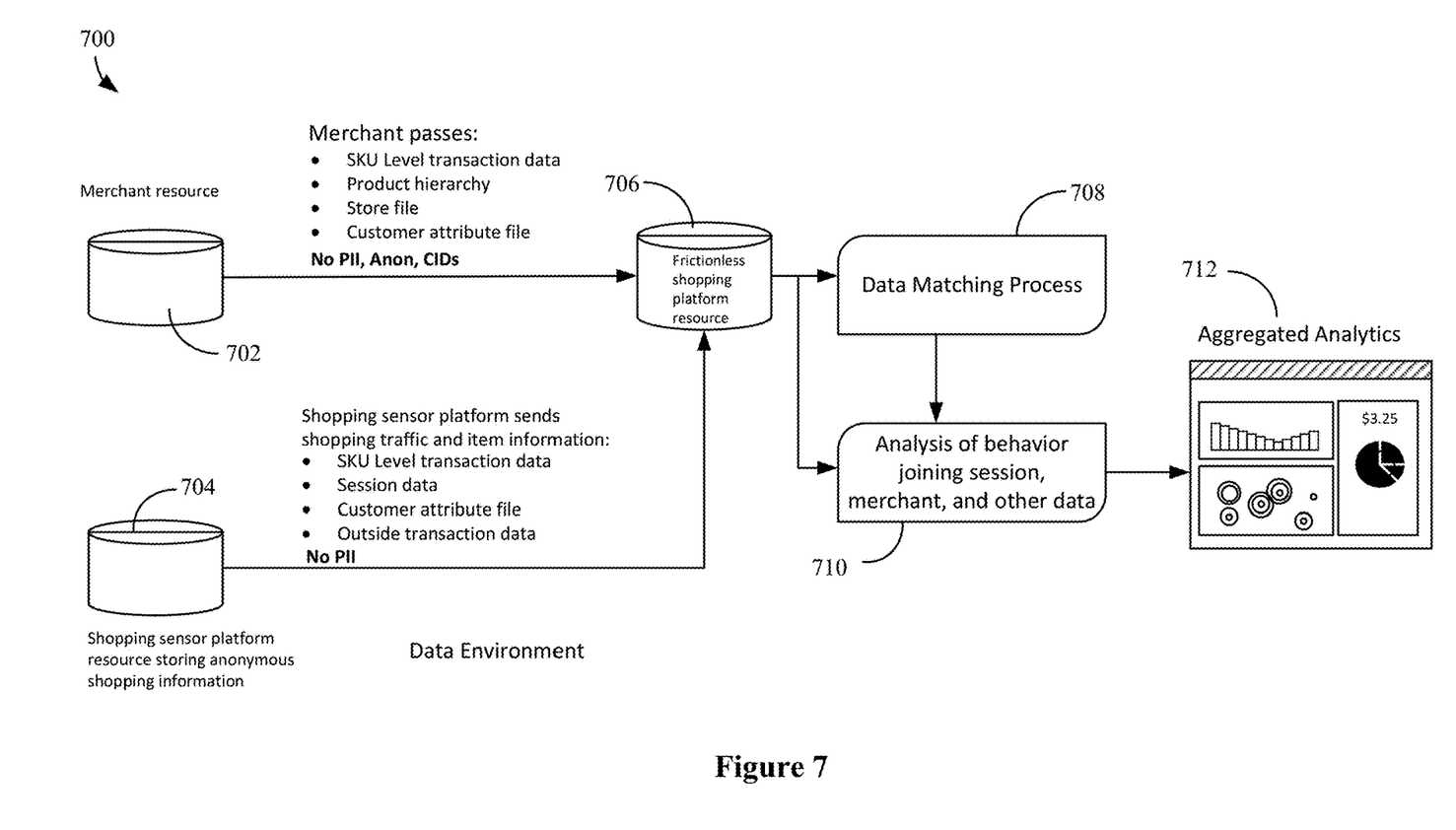
FIG. 7 illustrates a specific example data flow for analysis of frictionless shopping data.

FIG. 7 illustrates a specific example data flow for analysis of frictionless shopping data. The frictionless shopping platform can further include an analytics component (e.g., software providing various analytics features). The analytics component can be accessed, for example, through a graphical user interface to the frictionless shopping platform or made available through APIs, to provide insights on usage or other aspects of interest for a Merchant.

Referring to FIG. 7, an example environment 700 for analytics can include merchant resource 702 storing information managed by a Merchant, shopping sensor platform resource 704 storing anonymous shopping information, including traffic and item information, and frictionless shopping platform resource 706. The merchant resource 702 passes SKU level transaction data, product hierarchy, store files, and customer attribute files to an aggregate merchant transaction data level resource of the frictionless shopping platform 706. The shopping sensor platform resource 704 sends session data to the aggregate merchant transaction data level resource of the frictionless shopping platform 706. The frictionless shopping platform performs (708) a data matching process to match customer attribute files provided by the merchant resource 702 to anonymous shopper data provided by the shopping sensor platform resource 704; and performs (710) analysis of behavior of the shoppers, merchant, and other data, including outside transaction data of the customer.

A method for analyzing frictionless shopping data (e.g., operations 708 and 710) includes receiving aggregate data on inventory of a plurality of items and customer traffic from an anonymous shopping cart resource. The aggregate data comprises a number of each of the plurality of items that are available for purchase, a number of items that are purchased from a merchant store, and a number of customers that enter the merchant store. The method further includes applying one or more optimizing criteria to the aggregate data and adjusting the price of at least one of the plurality of items based on the one or more optimizing criteria or adjusting inventory of the number of at least one of the plurality of items that are available for purchase. In some cases, the one of the one or more optimizing criteria comprises a ratio of the number of one of the plurality of items that are sold by the amount of foot traffic.

The results of the analysis can be viewed and utilized by the merchant as part of aggregated analytics 712. In some cases, automated adjustments can be made to pricing and/or notifications can be given to the merchant to move product around in the store, as some examples.

Figure 8:
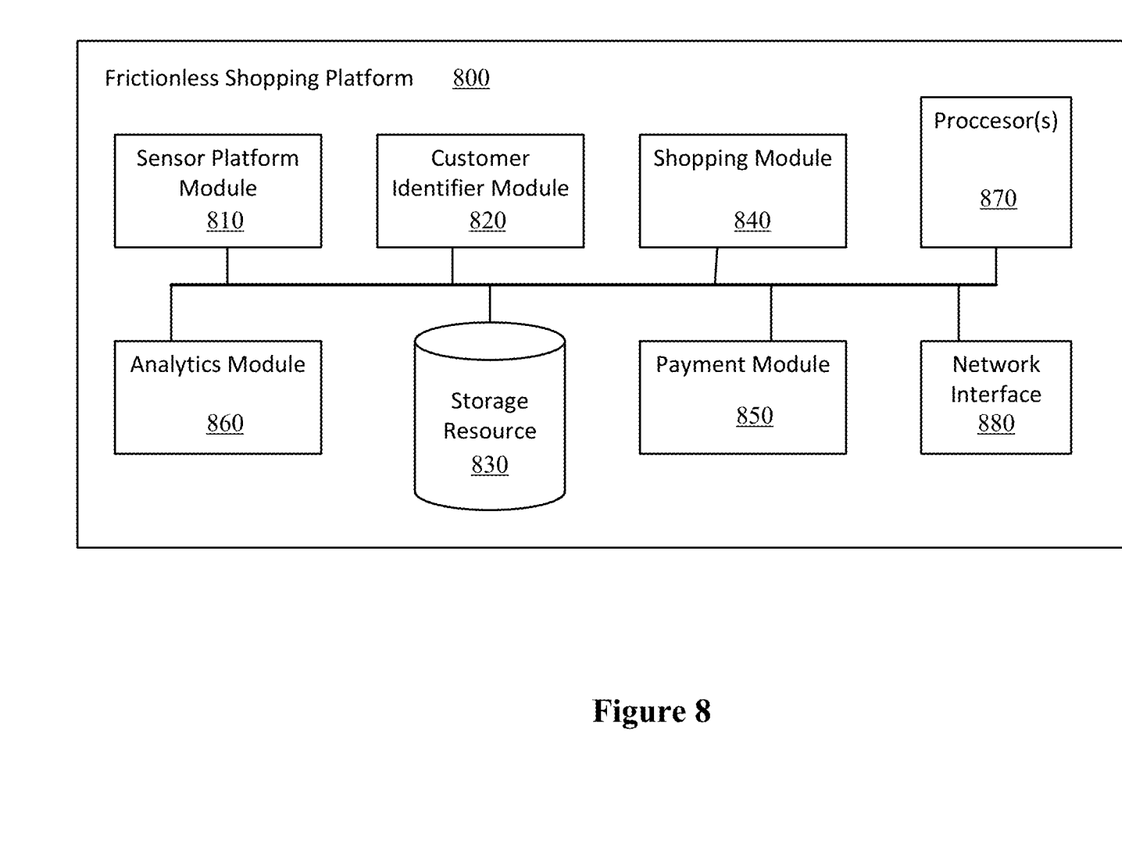
FIG. 8 illustrates a representation of a frictionless shopping platform.

FIG. 8 illustrates a representation of a frictionless shopping platform. Referring to FIG. 8, a frictionless shopping platform 800 can include a sensor platform module 810, a customer identifier module 820, a storage resource 830, a shopping module 840, a payment module 850, and an analytics module 860.

The frictionless shopping platform 800 can include one or more blade server devices, standalone server devices, personal computers, routers, hubs, switches, bridges, firewall devices, intrusion detection devices, mainframe computers, network-attached storage devices, and other types of computing devices.

Sensor platform module 810 can manage the communications with a shopping sensor platform, for example by obtaining information regarding appropriate APIs for the sensors of the shopping sensor platform used in a particular store. The information regarding the appropriate APIs may be initially obtained when the shopping sensor platform is registered/selected for the particular store and the sensor platform module 810 can manage the communications during use of the shopping sensor platform by using the appropriate APIs. Sensor platform module 810 can receive an anonymous shopper identifier and shopping information (e.g., item information) for the anonymous shopper identifier and can store the anonymous shopper identifier and shopping information in storage resource 830, for example, for use by shopping module 840 (and as described with respect to operations 603, 604, and 605 of FIG. 6).

Customer identifier module 820 can receive identification information and store the identification information in storage resource 830, for example as described with respect to operations 601 and 602 of FIG. 6. In some cases, the customer identifier module 820 can receive payment information of a customer and an identifier of the customer and store the identifier of the customer in the storage resource 830.

Storage resource 830 can store data of customers and anonymous shopping data such as described with respect to storage resources 107, 117, 610.

Shopping module 840 can communicate with sensor platform module 810 in order to receive information from a shopping sensor platform and transmit information to the shopping sensor platform. In some cases, shopping module 840 authorizes a customer to begin shopping by providing an indication that the customer is approved for entering the store to the shopping sensor platform when a payment pre-approval for the customer is received via the payment module 850. The shopping module 840 can maintain a relationship between the identifier of the customer, the anonymous shopper identifier, and the item information. The shopping module 840 may further determine a conclusion of a shopping session for the customer.

Payment module 850 can support operations for payment transactions with respect to a shopping cart and generation of an invoice, such as described with respect to operation 236 and API 238 of FIG. 2. In some cases, the payment module 850 sends a pre-authorization package including the payment information of the customer received via the customer identifier module 820 to a financial services provider; and receives a payment pre-approval for the customer from the financial services provider. In some cases, the payment module 850, upon the shopping module 840 determining that the shopping session for a customer has concluded, can generate an invoice based on the item information, provide the invoice to the financial services provider for payment processing, receive payment confirmation of the invoice from the financial services provider, and provide a digital receipt to the customer indicating the payment confirmation of the invoice.

Analytics module 860 can receive data from a merchant resource and a shopping sensor platform resource and perform data matching processes and analysis of behavior, such as described with respect to operations 708 and 710 of FIG. 7.

Processor(s) 870 may be implemented within a single processing device but may also be distributed across multiple processing devices or sub-systems that cooperate in executing program instructions. Examples of processors 870 include general purpose central processing units (CPUs), graphics processing units (GPUs), field programmable gate arrays (FPGAs), application specific processors, and logic devices, as well as any other type of processing device, combinations, or variations thereof.

Network interface 880 may include communications connections and devices that allow for communication with other computing systems over one or more communication networks. Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems.

Modules 810, 820, 840, and 850 can perform functions for mobile services 103 and 113 as described with respect to FIGS. 1A and 1B (and in some cases mobile services 103 and 113 can further include the functionality of module 860, which can perform functions described with respect to FIG. 7). In some cases, one or more of modules 810, 820, 840, 850 and 860 include instructions stored on storage media that, when executed by one or more processors 870 of the frictionless shopping platform, direct the platform 800 to perform the described processes. In some cases, one or more of modules 810, 820, 840, 850 and 860 include their own devoted processor or hardware to support and perform the described processes.

In some cases, the frictionless shopping platform provides a plug and play configuration for any store to implement the frictionless shopping experience. In some of such cases, frictionless shopping platform 800 can be configured as a multi-tenant platform where a store can register their configuration of the shopping sensor platform and customer profiles are stored associated with that store. In some cases, each store or a set of stores with a similar profile (e.g., from a same company) can have devoted resources supporting the frictionless shopping platform 800.

It should be understood that any private and/or confidential data that is collected and/or transmitted by any of the systems described herein would be kept secure and its use specifically approved of by the consumer to, at a minimum, meet the requirements for handling of personal information as set out by the laws and regulations of various countries and states.

Certain Embodiments may be implemented as a computer process, a computing system, or as an article of manufacture, such as a computer program product or computer-readable storage medium. Certain methods and processes described herein can be embodied as software, code and/or data, which may be stored on one or more storage media. Certain embodiments of the invention contemplate the use of a machine in the form of a computer system within which a set of instructions, when executed by hardware of the computer system (e.g., a processor or processing system), can cause the system to perform any one or more of the methodologies discussed above. Certain computer program products may be one or more computer-readable storage media readable by a computer system (and executable by a processing system) and encoding a computer program of instructions for executing a computer process. It should be understood that as used herein, in no case do the terms "storage media", "computer-readable storage media" or "computer-readable storage medium" consist of transitory carrier waves or propagating signals.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A frictionless shopping method, comprising:
   receiving, by one or more processors of a frictionless shopping platform, aggregate data on inventory of a plurality of items and customer traffic from an anonymous shopping cart resource of a shopping sensor platform with a plurality of sensors, wherein the aggregate data comprises a number of each of the plurality of items that are available for purchase, a number of items that are purchased from a merchant store, and a number of customers that enter the merchant store;
   applying, by the one or more processors, one or more optimizing criteria to the aggregate data;
   adjusting, by the one or more processors, a price of at least one of the plurality of items based on the one or more optimizing criteria or adjusting inventory of the number of at least one of the plurality of items that are available for purchase;
   receiving, by the one or more processors, payment information of a customer and an identifier of the customer, wherein the payment information of the customer and the identifier of the customer are received via a kiosk application of a kiosk at the merchant store or a mobile application of a customer computing device;
   storing, by the one or more processors, the identifier of the customer;
   sending, by the one or more processors, a pre-authorization package comprising the payment information of the customer to a payment processor of a financial services provider;
   receiving, by the one or more processors, a payment pre-approval for the customer from the payment processor of the financial services provider;
   in response to receiving the payment pre-approval, authorizing, by the one or more processors, the customer to begin shopping including providing an indication that the customer is approved for entering the store to the shopping sensor platform, wherein authorizing the customer to begin shopping further comprises communicating a code to the customer;
   after providing the indication that the customer is approved for entering the store, receiving, by the one or more processors, an anonymous shopper identifier from the shopping sensor platform;
   receiving, by the one or more processors, item information associated with the anonymous shopper identifier from at least one of the plurality of sensors of the shopping sensor platform, wherein the item information comprises at least the price of at least one of the plurality of items;
   maintaining, by the one or more processors, a relationship between the identifier of the customer, the anonymous shopper identifier, and the item information;
   determining, by the one or more processors, a conclusion of a shopping session for the customer;
   upon the conclusion of the shopping session, generating, by the one or more processors, an invoice based on the item information and providing the invoice to the payment processor of the financial services provider for payment processing;
   receiving payment confirmation of the invoice from the payment processor of the financial services provider; and
   in response to receiving the payment confirmation of the invoice, transmitting, by the one or more processors, a digital receipt to the customer computing device indicating the payment confirmation of the invoice.

2. The method of claim 1, wherein communicating the code to the customer comprises sending a QR code to the customer.

3. The method of claim 1, wherein the identifier of the customer is an email address or telephone number.

4. The method of claim 1, wherein one of the one or more optimizing criteria comprises a ratio of the number of one of the plurality of items that are sold by an amount of foot traffic.

5. A frictionless shopping platform comprising:
   one or more processors;
   a storage resource;
   instructions stored at the frictionless shopping platform that when executed by the one or more processors, direct the frictionless shopping platform to at least:
     receive aggregate data on inventory of a plurality of items and customer traffic from an anonymous shopping cart resource of a shopping sensor platform with a plurality of sensors, wherein the aggregate data comprises a number of each of the plurality of items that are available for purchase, a number of items that are purchased from a merchant store, and a number of customers that enter the merchant store;
     apply one or more optimizing criteria to the aggregate data;
     indicate an adjustment for a price of at least one of the plurality of items based on the one or more optimizing criteria or adjusting inventory of the number of at least one of the plurality of items that are available for purchase;
     receive payment information of a customer and an identifier of the customer, wherein the payment information of the customer and the identifier of the customer are received via a kiosk application of a kiosk at the merchant store or a mobile application of a customer computing device;
     store the identifier of the customer in the storage resource;
     send a pre-authorization package comprising the payment information of the customer to a payment processor of a financial services provider;
     receive a payment pre-approval for the customer from the financial services provider;
     in response to receiving the payment pre-approval, authorize the customer to begin shopping including providing an indication that the customer is approved for entering the store to the shopping sensor platform, wherein authorizing the customer to begin shopping further comprises communicating a code to the customer;

after providing the indication that the customer is approved for entering the store, receive an anonymous shopper identifier from the shopping sensor platform;

receive item information associated with the anonymous shopper identifier from at least one of the plurality of sensors of the shopping sensor platform, wherein the item information comprises at least the price of at least one of the plurality of items;

maintain a relationship between the identifier of the customer, the anonymous shopper identifier, and the item information;

determine a conclusion of a shopping session for the customer;

upon the conclusion of the shopping session, generate an invoice based on the item information and provide the invoice to the payment processor of the financial services provider for payment processing;

receive payment confirmation of the invoice from the payment processor of the financial services provider; and in response to receiving the payment confirmation of the invoice, transmit a digital receipt to the customer computing device indicating the payment confirmation of the invoice.

6. The platform of claim 5, wherein instructions to communicate the code to the customer direct the platform to send a QR code to the customer.

7. The platform of claim 5, wherein the identifier of the customer is an email address or telephone number.

8. The platform of claim 5, wherein one of the one or more optimizing criteria comprises a ratio of the number of one of the plurality of items that are sold by an amount of foot traffic.

9. A non-transitory computer-readable storage medium having instructions stored thereon, that when executed by a computing system, direct the computing system to:

receive aggregate data on inventory of a plurality of items and customer traffic from an anonymous shopping cart resource of a shopping sensor platform with a plurality of sensors, wherein the aggregate data comprises a number of each of the plurality of items that are available for purchase, a number of items that are purchased from a merchant store, and a number of customers that enter the merchant store;

apply one or more optimizing criteria to the aggregate data;

indicate an adjustment for a price of at least one of the plurality of items based on the one or more optimizing criteria or adjusting inventory of the number of at least one of the plurality of items that are available for purchase;

receive payment information of a customer and an identifier of the customer, wherein the payment information of the customer and the identifier of the customer are received via a kiosk application of a kiosk at the merchant store or a mobile application of a customer computing device;

store the identifier of the customer in the storage resource;

send a pre-authorization package comprising the payment information of the customer to a payment processor of a financial services provider;

receive a payment pre-approval for the customer from the financial services provider;

in response to receiving the payment pre-approval, authorize the customer to begin shopping including providing an indication that the customer is approved for entering the store to the shopping sensor platform, wherein authorizing the customer to begin shopping further comprises communicating a code to the customer;

after providing the indication that the customer is approved for entering the store, receive an anonymous shopper identifier from the shopping sensor platform;

receive item information associated with the anonymous shopper identifier from at least one of the plurality of sensors of the shopping sensor platform, wherein the item information comprises at least the price of at least one of the plurality of items;

maintain a relationship between the identifier of the customer, the anonymous shopper identifier, and the item information;

determine a conclusion of a shopping session for the customer;

upon the conclusion of the shopping session, generate an invoice based on the item information and provide the invoice to the payment processor of the financial services provider for payment processing;

receive payment confirmation of the invoice from the payment processor of the financial services provider; and in response to receiving the payment confirmation of the invoice, transmit a digital receipt to the customer computing device indicating the payment confirmation of the invoice.

10. The medium of claim 9, wherein one of the one or more optimizing criteria comprises a ratio of the number of one of the plurality of items that are sold by an amount of foot traffic.

11. The medium of claim 9, wherein instructions to communicate the code to the customer direct the platform to send a QR code to the customer.

12. The medium of claim 9, wherein the identifier of the customer is an email address or telephone number, wherein the digital receipt is transmitted to the email address or telephone number.

* * * * *